Sept. 19, 1967  W. O. CRUSINBERRY  3,342,996
LIGHT SENSITIVE POWER CONTROL CIRCUIT INCLUDING DIODE SWITCH
Filed Sept. 30, 1964

William O. Crusinberry
INVENTOR

BY

ATTORNEY

United States Patent Office 3,342,996
Patented Sept. 19, 1967

3,342,996
LIGHT SENSITIVE POWER CONTROL CIRCUIT INCLUDING DIODE SWITCH
William O. Crusinberry, Dallas, Tex., assignor to Hunt Electronics Company, Dallas, Tex., a corporation of Texas
Filed Sept. 30, 1964, Ser. No. 400,321
4 Claims. (Cl. 250—206)

ABSTRACT OF THE DISCLOSURE

There is disclosed in the specification and drawings a power control circuit for controlling the effective power applied to a load from a source of alternating current supply voltage as a function of the intensity of ambient light impinging upon a photosensitive element. The diode device is connected in series with the load, a source of alternating current supply voltage, and the secondary winding of the transformer, the transformer being utilized to apply a control signal to the diode device to cause it to switch to the low impedance state at a time in each half cycle of the applied alternating current supply voltage that varies in accordance with the intensity of light impinging upon the photoelectric device. The circuit for generating the control signal is connected in shunt with the diode device and includes three branches, one branch comprising the photo-sensitive device, the second branch comprising a second diode device, and the third branch comprising a capacitor and the primary of the transformer. The control signal is applied to the first diode device when the capacitor is charged to the breakover voltage of the second diode device. The photoresistive device controls the amount of voltage applied to charge the capacitor and thereby controls the time in half cycle that the capacitor is charged to the breakover voltage of the second diode device.

---

It is often times desirable to control the power applied to a load as a function of the ambient light. Thus, for example, street lights are often automatically turned on at dusk and turned off at dawn. Outside lighting utilized for plant protection and similar purposes is similarly operated.

The lighting loads operated in this manner are normally provided either for security or safety purposes and the reliability of operation is extremely important. Further, since there may be quite a large number of lighting devices involved, which may be quite expensive to replace, it is desirable that power be applied to the lighting elements slowly to permit the filaments to warm up gradually and thereby increase the life of the lamp element. Further, in view of the large electric load drawn by, for example, the tremendous number of street lights found in any city of an appreciable size, substantial savings can be achieved by only supplying power to the lights at a level required to accommodate the conditions of ambient light existing at any particular time.

Several types of power controls for accomplishing the above desired function have been suggested and used. Thus, relays which are actuated by photosensitive elements have been used quite extensively. Such controls have received widespread acceptance. However, in general, the relay operated controls function as an on-off type of control in which full power is either applied to or withdrawn from the lighting elements. They are, therefore, not susceptible for providing the desired function of applying the power slowly to the filaments of the lighting element in order that the life of the element may be extended, nor is it possible to control the amount of power applied to the lighting element in a manner such that only the required amount of power is utilized. Large loads can cause burning of the relay contacts and consequent reduction in reliability of operation.

Three electrodes thyratron type devices, such as gas tubes or silicon control rectifiers have also been used in these applications. Although such power controls are capable of controlling the amount of power applied to the filament of the lighting elements in accordance with the ambient light with the attendant advantages of only utilizing the required amount of power and prolonging the filament life, these controls are usually considerably more expensive than the relay controls. However, silicon control rectifiers are frequently burned out by high voltage transients of the type produced when power is switched unless protective circuitry is provided.

The present invention provides an improved photosensitive power control which provides all of the advantages of the controls utilizing the three electrode thyratron type devices, but which is considerably less expensive. In accordance with the present invention, a diode device which exhibits a normally high impedance state but which is capable of being switched to a quasi stable lower impedance state responsive to a voltage of predetermined character being applied thereto is utilized as the control element. The preferred type device is a five layer symmetrical device manufactured by Hunt Electronics Company, assignee of the present invention, and sold under the name "Silicon Symmetrical Switch." However, other similar diode devices such as the Shockley diode can be utilized.

The device is connected in series with the load which is to be controlled and a source of alternating current supply voltage. A transformer is provided for applying a voltage of a character to cause the diode device to switch to the low impedance state to permit current flow in one direction responsive to the application of the control pulse to the input of the transformer. Means connected in parallel with the diode device are provided for generating the control pulse. Systems such as that described above are disclosed in Patent application Ser. No. 184,841, filed Apr. 3, 1963, now Patent No. 3,188,490 and assigned to the assignee of the present invention.

The present invention constitutes an improvement over the invention disclosed in the above described application and is especially adapted for controlling a light responsive to the intensity of the ambient light. Thus, in accordance with the preferred embodiment of the present invention, the last named means comprises a parallel circuit having three branches and a resistor connected at one terminal to one side of the parallel circuit. The other side of the resistor and the other side of the parallel circuit are connected to the power supply lines such that the control circuit is maintained in shunt with the diode device. One branch of the parallel circuit suitably consists of a capacitor and the primary winding of the transformer connected in series. The second branch of the parallel circuit suitably comprises a voltage sensitive control element and the third branch of the parallel circuit comprises a photosensitive element and a capacitor connected in series. The circuit of the present invention is operable if the third branch consists of only the photosensitive element. However, it has been found possible to achieve a much better degree of control by incorporating the capacitive element and a variable resistor in parallel with the photosensitive element in the third branch. The photosensitive element controls the voltage to which the capacitor in the first branch is charged. The phase relationship between the beginning of a half cycle and breakdown of the voltage sensitive control element is thereby controlled. When the voltage sensitive control element switches to the low impedance state, the capacitor discharges through the input of the transformer, inducing a voltage at the transformer output of a character to cause the diode device connected in series with the load to switch to its quasi stable low impedance state.

Many objects and advantages of the invention will become readily apparent to those skilled in the art as the detailed description of the same unfolds when taken in conjunction with the appended drawings wherein like reference numerals denote like parts and in which.

Figure 1:
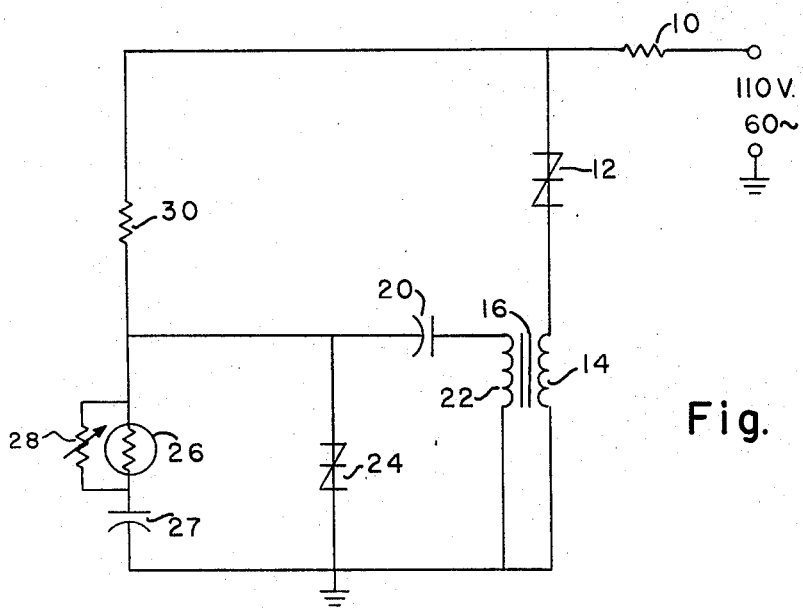
FIGURE 1 illustrates one embodiment of the invention.

Turning now to FIGURE 1 of the drawings, a source of alternating current supply voltage, suitably 110 volts, 60 cycles, is connected to one side of a load 10, suitably the filament of an incandescent lamp. The other side of the load 10 is connected to one side of a semiconductor device 12.

Figure 2:
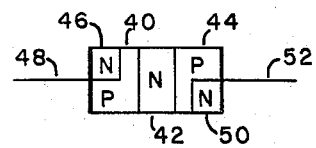
FIGURE 2 illustrates the structure of a preferred type of diode devices used in practicing the invention.

As shown in FIGURE 2, the semiconductor device 12 is suitable one having three layers 40, 42 and 44, contiguous layers being of opposite type conductivity. A region 46 of opposite conductivity type is formed in layer 40, and electrode 48 contacts both the region 46 and the layer 40. Similarly, a region 50 of opposite conductivity type is formed in layer 44 with the electrode 52 contacting the region 50 and layer 44. The regions 46 and 50 are offset from one another and the structure resembles two oppositely poled Shockley diodes formed in a single body of semiconductor material. The device 12 is one which normally exhibits a high impedance to the passage of current in either direction but which can be switched to exhibit a low impedance to the flow of current in either direction responsive to application of a voltage of a predetermined character thereacross. The particular device shown is symmetrical in its switching action, that is to say by applying a voltage of predetermined character of proper polarity, the device can be alternately switched to permit current to flow in opposite directions and thereby achieve full wave power control.

The other side of the device 12 is connected through the secondary winding 14 of a transformer 16 to the other side of the alternating current supply voltage. It is therefore seen that the device 12 is connected in series with the source of alternating current supply voltage and the load 10 and controls the application of power to the load 10.

Connected in shunt with the device 12 is a circuit for generating a control signal which controls the impedance state of the device 12. Thus, a resistor 30 is connected at one terminal to the juncture between the load 10 and the device 12. The other side of the resistor 30 is connected to a parallel circuit having three branches. One branch of the parallel circuit comprises a capacitor 20 connected in series with the primary winding 22 of the transformer 16. The second branch of the parallel circuit suitably comprises a second device 24 which is similar in its switching action to the device 12, but which requires a much lower voltage to cause it to assume the low impedance state. It will be noted that the location of the device 24 and the capacitor 20 in the circuit can be reversed. The third branch of the switching circuit preferably comprises a photosensitive element 26 and a capacitor 27 connected in series with a variable resistor 28 connected in parallel with the element 26, although some control can be obtained if the third branch consists of only the photosensitive element 26. The other side of the parallel circuit is connected to the source of alternating current supply voltage.

Figure 3:
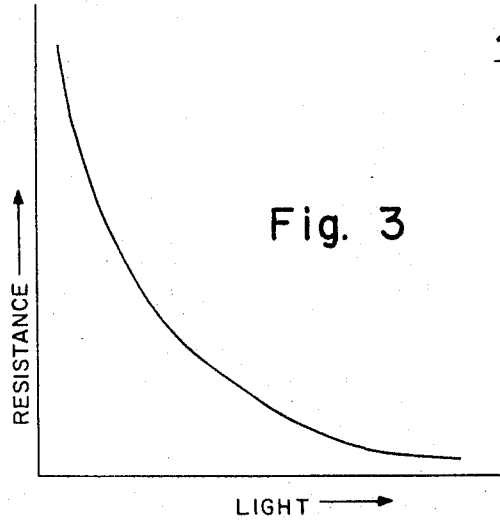
FIGURE 3 is a curve illustrating the manner in which the resistance of a photosensitive element used in practicing the invention varies as the intensity of light impinging upon the device varies.

The circuit shown in FIGURE 1 will control the application of power to a load in accordance with the ambient light impinging upon the photosensitive element 26 even if the variable resistor 28 and the capacitor 27 are not provided. Thus, the resistance of the device 26 will vary in accordance with the intensity of light impinging upon the device as shown in FIGURE 3 wherein the resistance of the device is quite low, suitably in the order of 100 to 300 ohms for high levels of light intensity and very large, in the order of several megohms, if the intensity of the light impinging upon the device is extremely low.

The device 26 and resistor 30 function as a voltage divider network wherein the voltage appearing across the device 26 increases as the resistance increases. Once the voltage appearing across the device 26 becomes equal to the breakdown voltage of the device 24, the device 24 will switch to the low impedance state. The capacitor 20 will be charged to the voltage appearing across the device 26, and when the device 24 breaks down, the capacitor will discharge through the device 24, causing a pulse of current to flow through the primary winding 22 of the transformer 16.

The current flowing through the primary winding 22 of the transformer 16 will cause a high voltage pulse to be induced in the secondary winding 14. The high voltage pulse appearing across the secondary winding 14 will cause the device 12 to switch to a quasi stable low impedance state, permitting current to flow through the load 10 until near the end of the half cycle of alternating current supply voltage, at which time the device will return to the high impedance state. Since the devices 12 and 24 are each symmetrical, power will flow through the load during each half cycle of applied alternating current supply voltage during those times in which the resistance of the device 26 is sufficiently high that the instantaneous voltage developed across the device 26 will be at least equal to the breakdown voltage of the device 24 at some point in the half cycle. However, if the circuit shown in FIGURE 1 is utilized without the capacitor 27, the minimum power that will ever be applied to the load 10 will be quite large and the optimum benefits of slow turn on and power savings will not be obtained.

By providing the capacitor 27 which is suitably at least an order of magnitude larger than the capacitor 20, the additional benefits of slow turn on and substantial power savings will be obtained. In the presence of a relatively high degree of ambient light, the voltage appearing across the device 24 will lag the voltage appearing across the device 12 by a phase angle of almost 90° due to the large capacitive reactance. When the resistance of the device 26 has increased to the minimum level necessary to cause the device 24 to break down, the voltage appearing across the device 24 will still lag the voltage appearing across the device 12 and breakdown of the device 12 will occur very near the end of a half cycle of alternating current supply voltage. The effective power applied to the load 10 will thereby be substantially less than full power.

As the resistance of the device 26 increases due to a decrease in the intensity of light impinging upon the device, the phase angle between the voltage appearing across the device 24 and the voltage appearing across the device 12 will decrease at the same time the voltage appearing across the device 24 become a greater percentage of the instantaneous applied voltage, causing the device 24 and the device 12 to switch to the low impedance state at an earlier time in the half cycle of alternating current supply voltage. The effective power applied through the load will therefore be increased. At such time as the intensity of the light impinging upon the device 26 becomes quite low, the resistance of the device 26 will become very large. The voltage appearing across the device 24 will be substantially in phase with the voltage appearing across the device 12 and also the voltage appearing across the device 26 will become large as compared with the voltage appearing across the device 30. The device 24 and the device 12 will each therefore switch to the low impedance state early in the half cycle of applied alternating current supply voltage, applying substantially the full power to the load 10.

The variable resistor 28 connected in shunt with the device 26 is utilized for controlling the light level required to cause power to be applied to the load. Since the variable resistor 28 is in parallel with the device 26, it will reduce the effective resistance of the parallel circuit comprising the device 26 and resistor 28, thereby decreasing the minimum level of light intensity at which power will be applied to the load. The maximum power applied to the load 10 can also be controlled by adjusting the variable resistor 28 since the effective resistance of the parallel circuit comprising the device 26 and the resistor 28 can never be greater than the resistance to which the device 28 is set.

The resistance of the resistor 30, while not critical, is of some importance. As it functions as a portion of a voltage divider as well as providing a charge path for the capacitor 20, its size must be chosen with regard to the other components to provide turn on at the desired level of light intensity. Moreover, the resistance of the resistor 30 should be sufficiently high to insure that the leakage current flowing through the resistor 30 will be extremely small in order that the power dissipated across the control circuit will be only in the order of milliwatts.

In accordance with one embodiment of the invention, the following components were utilized:

| | |
|---|---|
| Resistor 28 | 0–50,000 ohms. |
| Resistor 30 | 15,000 ohms. |
| Capacitor 20 | 0.1 microfarad. |
| Capacitor 27 | 1.0 microfarad. |
| Transformer 16 | Turns ratio 1:40. |
| Diode 12 | Hunt SSS (200 v.) |
| Diode 24 | Hunt SSS (60 v.) |
| Photoresistor 26 | NSL 46. |

Using the above components, approximately 70% power was first applied to the load at a light level of 1.5 foot candles. At full darkness, approximately 95% power was applied to the load.

Although the invention has only been described with regard to a preferred embodiment thereof, many changes and modifications will become apparent to those skilled in the art in view of the foregoing description. The preferred embodiment of the invention described above is therefore intended to be illustrative and not limiting of the invention defined in the appended claims.

What I claim is:

1. A power control circuit for controlling the effective power applied to a load from a source of alternating current supply voltage as a function of the intensity of ambient light impinging upon a photosensitive element that comprises:
    (a) a first diode switching device which normally exhibits a high impedance between two terminals to the flow of current in at least one direction between said two terminals but which is capable of being switched to a quasi stable low impedance state in said at least one direction responsive to a voltage of predetermined character being applied thereto and which remains in the low impedance state so long as holding current flows through said device in said at least one direction;
    (b) means for connecting said first device by said two terminals in series with said load and said source of alternating current supply voltage; and
    (c) means for generating and applying to said first diode device a voltage of said predetermined character to cause said device to switch to said quasi stable low impedance state;
    (d) said last named means including a capacitor and a photosensitive element connected for said photosensitive element to control the voltage to which said capacitor is charged whereby the time during a half cycle at which said device switches to the low impedance state varies as a function of the intensity of light impinging upon the photosensitive element to thereby control the effective power applied to the load as a function of the intensity of ambient light.

2. A power control circuit for controlling the effective power applied to a load from a source of alternating current supply voltage as a function of the intensity of ambient light impinging upon photosensitive element that comprises:
    (a) a first diode switching device which normally exhibits a high impedance between two terminals to the flow of current in at least one direction between said two terminals but which is capable at being switched to a quasi stable low impedance state in said at least one direction responsive to a voltage of predetermined character being applied thereto and which remains in the low impedance state so long as holding current flows through said device in said at least one direction;
    (b) Means for connecting said first device by said two terminals in series with said load and said source of alternating current supply voltage; and
    (c) means for generating and applying to said first diode device a voltage of predetermined character to cause said device to switch to said quasi stable low impedance state;
    (d) said last means including:
        (1) a parallel circuit having three branches;
        (2) a resistor;
        (3) one of said three branches comprising the input of a transformer and one of a capacitor and a second diode device connected in series;
        (4) the second of said branches comprising the other of said capacitor and said second diode device;
        (5) the third branch comprising a photosensitive element whose resistance varies as an inverse function of the intensity of light impinging upon said element;
        (6) means connecting the output of said transformer in series with said first diode device; and
        (7) means connecting said resistor and said parallel circuit in series across said first device and the output winding of said transformer.

3. A power control circuit as defined in claim 2 wherein said third branch comprises a second capacitor connected in series with a photosensitive element whose resistance varies as an inverse function of the intensity of light impinging upon said element, said second capacitor being of greater capacitance than said first mentioned capacitor.

4. A power control circuit as defined in claim 3 further including a variable resistor connected in shunt with said photosensitive element.

References Cited

UNITED STATES PATENTS 3,080,491    3/1963    Howell _____ 250—206

RALPH G. NILSON, *Primary Examiner.*

M. ABRAMSON, *Assistant Examiner.*